(No Model.)

H. SANGSTER.
TEA KETTLE.

No. 356,895. Patented Feb. 1, 1887.

Witnesses.
Arthur J. Sangster
Henry Ashbery

Inventor.
Hugh Sangster
By James Sangster
Atty.

UNITED STATES PATENT OFFICE.

HUGH SANGSTER, OF BUFFALO, NEW YORK, ASSIGNOR TO URANIA N. SANGSTER, OF SAME PLACE.

TEA-KETTLE.

SPECIFICATION forming part of Letters Patent No. 356,895, dated February 1, 1887.

Application filed December 10, 1885. Serial No. 185,207. (No model.)

*To all whom it may concern:*

Be it known that I, HUGH SANGSTER, a citizen of the United States, residing in the city of Buffalo, in the county of Erie and State of New York, have invented certain new and useful Improvements in Tea-Kettles, of which the following is a specification.

My invention is an improvement in sheet-metal tea-kettles, either spun, stamped, or otherwise brought into shape; and it consists in the construction of the handle and ears, whereby the same are rendered more durable and the handle is made easily removable when required, all of which will be fully and clearly hereinafter shown, described, and claimed by reference to the accompanying drawings, in which—

Figure 1:
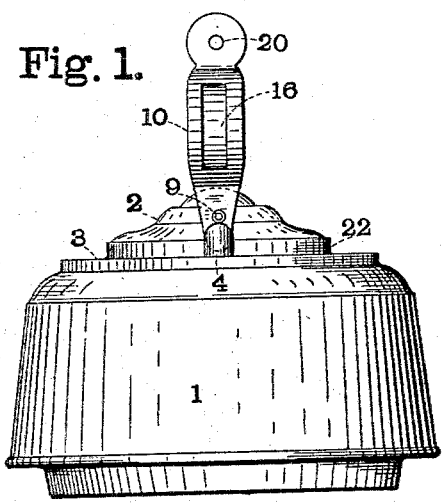
Figure 2:
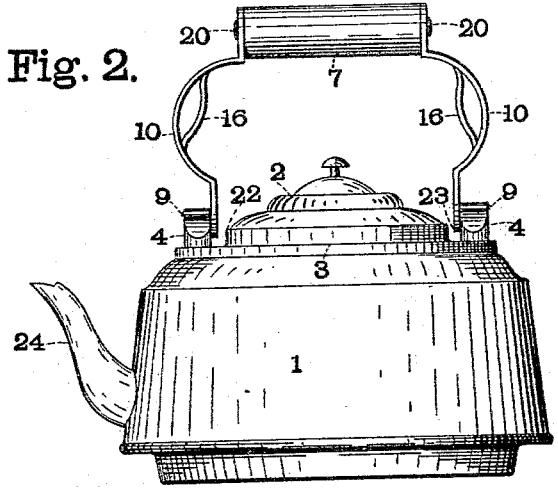
Figure 3:
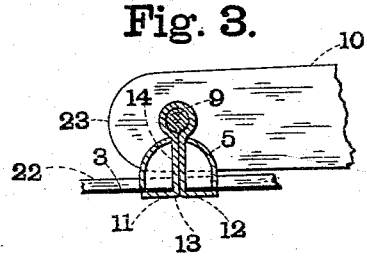
Figure 4:
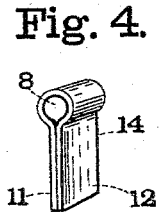
Figure 5:
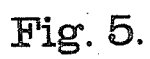
Figure 6:
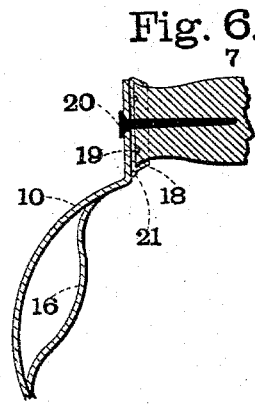
Figure 7:
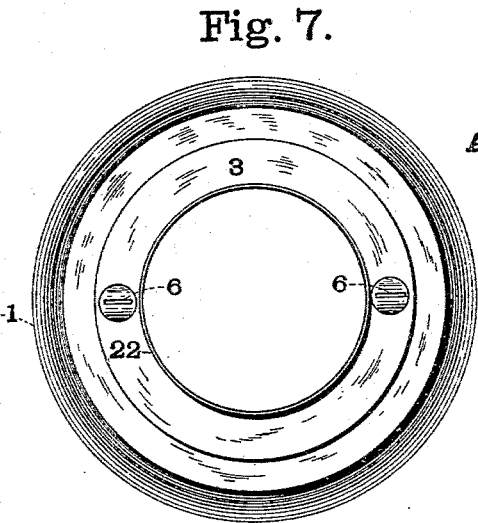
Figure 8:
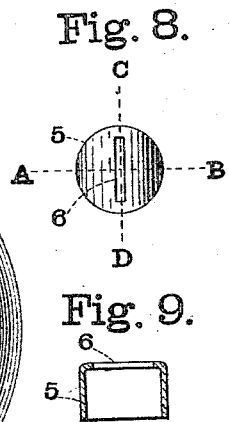
Figure 9:

Figure 1 is a back elevation of a tea-kettle and handle. Fig. 2 is a side elevation of the same. Fig. 3 represents a small portion of the top of the kettle in section, also a cross-section through one of the ears and a portion of the handle in position to be disengaged from its connection with the ears, showing also the means for attaching the ears to the top of the kettle. Fig. 4 is a perspective view of one of the parts (enlarged) of the ear before being put together. Fig. 5 is a section in line A B, Fig. 8, of the outer shell or case of the ear. Fig. 6 is a section through a portion of the handle, showing the way in which the sides of the handle are attached to the wooden portion. Fig. 7 is a top view of the kettle, the cover, the spout, a portion of the ear, and the handle being left off. Fig. 8 is a top view of the outer case or shell of the ear; and Fig. 9 is a section through the outer case of the ear in line C D, Fig. 8.

In said drawings, 1 represents the body of the kettle. It is made of any suitable sheet metal—such as copper, brass, tin-plate, &c.—and is stamped or spun or otherwise brought into shape in any well-known way.

The cover 2 is made and put on in the usual way.

The top portion, 3, of the kettle is made horizontal and flat, so as to receive the ears 4. They are composed of an outer case or shell, 5, open at the bottom, and having a long narrow slit or opening, 6, through the top. The bail or handle-holding piece 14 is made of a single piece of sheet metal, and is bent so as to leave the hole 8 for the pins 9 on the handle 10 to pass through, and the two parts 11 and 12, which lap together, as shown in Fig. 4.

The flat portion 3 of the kettle is provided with two slits or openings, 13, one on each side of the kettle directly opposite each other. An end view of one of the openings 13 is shown in Fig. 3. In fastening the ears of the kettle they are put just over the openings 13, so that the opening 6 will be directly over them. The part 14 is now slipped in through the opening 6 in the case 5, and down through the openings 13 in the top of the kettle. The two parts 11 and 12 are then bent so as to lie up against the under side of the top portion, 3, of the kettle, as shown in Fig. 3, after which they are soldered by a tinman's soldering-iron in the usual way, so that all the parts are firmly secured together.

7 represents the wooden portion of the handle. The metallic portions 10 are made of sheet metal, having a portion cut through and the part 16 bent the other way, so as to leave a brace to strengthen these portions. (See Figs. 1, 2, and 6.) These metal portions 10 are secured to the wood portion 7 by a disk of thin metal, 18, (see Fig. 6,) having its edge thrown over, as shown, and are prevented from turning by having a sharp-pointed tool driven in so as to produce the points 19, or in any other well-known way. The parts 10 are then secured to it by a screw or nail, 20, and are prevented from turning by a drop of solder at the point 21.

The handle is connected to the kettle-ears by means of the pins 9. (See Figs. 1, 2, and 3.) It is turned over on its side, as shown in Fig. 3. This brings the side or edge above the raised portion 22 on the breast of the kettle, so that the pins 9 can be entered into the openings 8, and when once entered the spring of the handle keeps them in place. When the handle is turned up, as when the kettle is being lifted, or for any purpose brought into the position shown in Figs. 1 and 2, the lower ends, 23, project down below the top of the ridge 22, and are then prevented from coming out, so that the kettle may be used and the handle will remain securely in place; but it is easily removed, when required, by first removing the cover from the kettle and turning the handle down to one side, as shown in Fig. 3.

This brings one of the narrow sides of the handle above the raised portion 22, in which position the parts of the handle having the pins 9 may be sprung toward each other, and the pins 9 thereby drawn out from the holes 8 in the ears, and the handle thereby removed.

It will be seen that the handle is made of thin sheet metal, so that its lower portions are flexible enough to be thus removed.

24 represents the ordinary tea-kettle spout, and is secured to the kettle in any well-known way.

I claim as my invention—

1. In a tea-kettle, the ears 4 and a flexible handle provided with lower projecting parts, 23, and pins 9, in combination with the raised portion 22, whereby the handle may be easily removed when required or securely held in place while being used, substantially as described.

2. The combination of the tea-kettle having the openings 13 in the top portion, 3, the shells 5, provided with narrow openings 6, the sheet-metal-holding pieces 14, formed so as to leave the eyes 8 and the two lower bent portions, 11 and 12, lying close together and passing down through the openings 6 in the shells 5 and through the openings 13, and having their lower ends bent up against the inside top of kettle and secured by solder, substantially as described.

3. The combination of the tea-kettle formed with flat portion 3, provided with ears, and the raised portion 22, in combination with a sheet-metal handle having projecting ends 23, and pins 9, as and for the purposes described.

HUGH SANGSTER.

Witnesses:
JENNIE M. CALDWELL,
ARTHUR J. SANGSTER.